Figure 1:
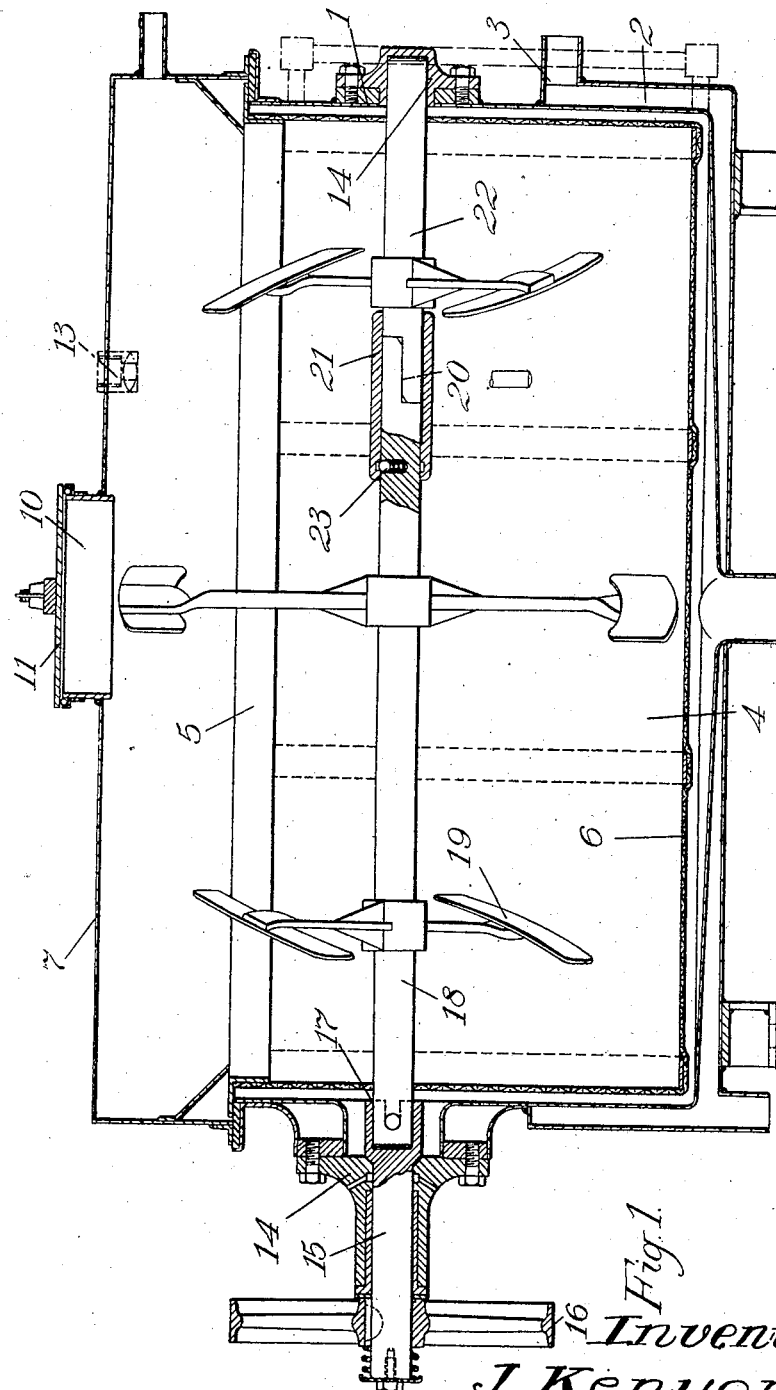

Nov. 9, 1948.   J. KENYON ET AL   2,453,630
PRODUCTION OF GELATINE OR GLUE FROM HIDES AND OTHER
COLLAGEN OR OSSEIN-CONTAINING MATERIALS
Filed Aug. 22, 1945   2 Sheets-Sheet 1

Inventors
J. Kenyon
V. Silberstein

Patented Nov. 9, 1948

2,453,630

UNITED STATES PATENT OFFICE 2,453,630

PRODUCTION OF GELATIN OR GLUE FROM HIDES AND OTHER COLLAGEN OR OSSEIN-CONTAINING MATERIALS

Joseph Kenyon, Barnes, London, and Victor Silberstein, Kensington, London, England, assignors of one-third to Hatim Attari, London, England Application August 22, 1945, Serial No. 612,073
In Great Britain March 12, 1943

3 Claims. (Cl. 260—118)

This invention relates to the production of gelatin and glue from hides and other collagen or ossein-containing materials.

It is desirable or even necessary to subject such materials to treatment whereby in particular fatty or waxy materials are removed prior to treatment in order to obtain aqueous dispersions of glue or gelatin.

For this purpose, it has been proposed to use volatile organic solvents and an alternative procedure which has been proposed is the use of solutions of alkali or other agents adapted to saponify or emulsify fatty and waxy components.

The employment, however, of concentrated solutions of alkali or even dilute solutions at relatively elevated temperatures, for instance temperatures of 40–50° C. which it might appear would be necessary or desirable for promoting the removal of the fatty and oily materials of the initial material leads not only to degradation of the gelatin or the impairment of the properties of the gelatin extracted, but also gives rise to other difficulties in that, for instance, in the case of bones in a relatively fine state of division the mass of material treated congeals and is refractory to further treatment for the extraction of the gelatin.

The present invention is based upon the observation that by the employment of dilute solutions of alkalies at low temperatures, the fats present in the materials provided that they are in a finely divided state may be saponified and the waxes present may be emulsified and removed leaving the residual material not only in a condition in which the extraction of the gelatin may subsequently be effected at relatively moderate temperatures, and from which gelatin or glue of higher quality may be obtained.

The invention therefore consists, broadly, in subjecting such material in a fine state of division to the action of a dilute solution of alkali at a temperature not materially exceeding 5 to 6° C. in order to saponify the fats and remove the waxes present, and to dissolve out or extract water-soluble matter while maintaining the finely divided material in motion in the solution, prior to subjecting the material to treatment with water and heat for the purpose of converting the collagen or ossein-containing materials into gelatin or glue and securing an aqueous dispersion thereof.

Conveniently the temperature at which this treatment is effected is in the neighbourhood of 3° C.

The dilute alkali solution employed should contain between 1 to 5 parts of sodium hydroxide or potassium hydroxide per 1000.

In these conditions the collagen and ossein and other proteins are substantially unaffected by the dilute solutions of alkali employed but the fats associated with them in the initial material are emulsified and saponified and the waxes are set free.

The efficiency of the extraction is partly dependent on the thoroughness with which the collagen or ossein-containing material is impregnated by the dilute solution of alkali and this is conditioned by the degree of sub-division of the material under treatment and the efficient circulation of the solution in contact with the finely divided material.

When treating hides, skins or leather the material is reduced to a fine state of division by abrasion so that in effect the material is in a filamentary condition.

In the case of bones, they are subjected to disintegration or grinding in order to obtain them in the form of a fine powder.

The fine state of division of the material treated in practice substantially necessitates the enclosure of the material in a container having finely porous walls formed, for instance, of wire gauze and forcing the alkaline solution through it while maintaining the material in a loose condition.

If the material thus treated be subjected to the action of hot water, the resulting solution of jelly is found to be coloured owing to the presence in it of some of the natural colouring matter released from the material in which the collagen or ossein-containing material has been distributed so that the hydrolysis of the collagen or ossein to obtain gelatin is carried out in an aqueous solution which is already coloured.

Preferably, therefore, in accordance with the invention, to avoid this result the initial material after having been subjected to the action of a dilute solution of alkali in the manner above referred to, is subjected to a bleaching operation which is also carried out at a low temperature.

Thus, in accordance with the invention, for the purpose of bleaching, a dilute solution of sodium percarbonate may be employed at a temperature of, for instance, between 5 and 6° C.

Optionally, the bleaching may be continued by the use of a solution of hydrogen peroxide also at a relatively low temperature and at, for instance, a temperature of 5 to 6° C.

The second bleaching treatment has the advantage that the unused bleaching agent leaves no by-product which might contaminate the resultant jelly.

The treatment above referred to may be carried out with the employment of tap water at a temperature of say 5 to 6° C. as a solvent for the various reagents, and the excess of the reagents and water may be removed by subjecting the treated material to pressure and finally by washing with distilled water.

The water used for washing or the greater proportion thereof may be expelled by pressure, after which the material may be subjected to treatment with distilled water at a temperature of 60° C. to 90° C. for periods varying from ten to thirty minutes, the extracted liquor being filtered and thereafter concentrated preferably in the manner described in the co-pending application Serial Number 612,072 of even date.

The apparatus preferably employed in carrying the invention into effect comprises essentially a vessel adapted to contain the alkaline solution, a finely foraminous container which may be adapted to be maintained in motion, and means in the container adapted to promote circulation of the aqueous solution of alkali through the contained material.

The container and its rigid framework may, for instance, be arranged to be rotated or oscillated and preferably with it there are associated vanes or impellers adapted to cause the aqueous extraction liquid to circulate freely through the container and thus through the material contained therein, and in conditions in which relative motion is secured between the particles of the material under treatment.

In these conditions the fats can be efficiently saponified and at the same time the wax and other impurities set free and removed.

The foraminous container may be removably located in an outer vessel furnished with a heating jacket and provided with an outlet by which the extracted material may be drawn, and longitudinally through the vessel there may be arranged to extend a rotatable shaft furnished with agitating blades.

In such a construction a removable closure may be provided on the upper portion of the vessel of a character adapted to permit access to all parts of the interior thereof for the removal, when necessary, of the foraminous container and having in it an inlet by which the material may be loaded into the foraminous container.

By the conjoint use of the method of extraction of the fatty constituents of the raw materials and the method of concentration described in the specification of the co-pending application referred to, gelatin of a very high quality may be obtained.

Figure 2:
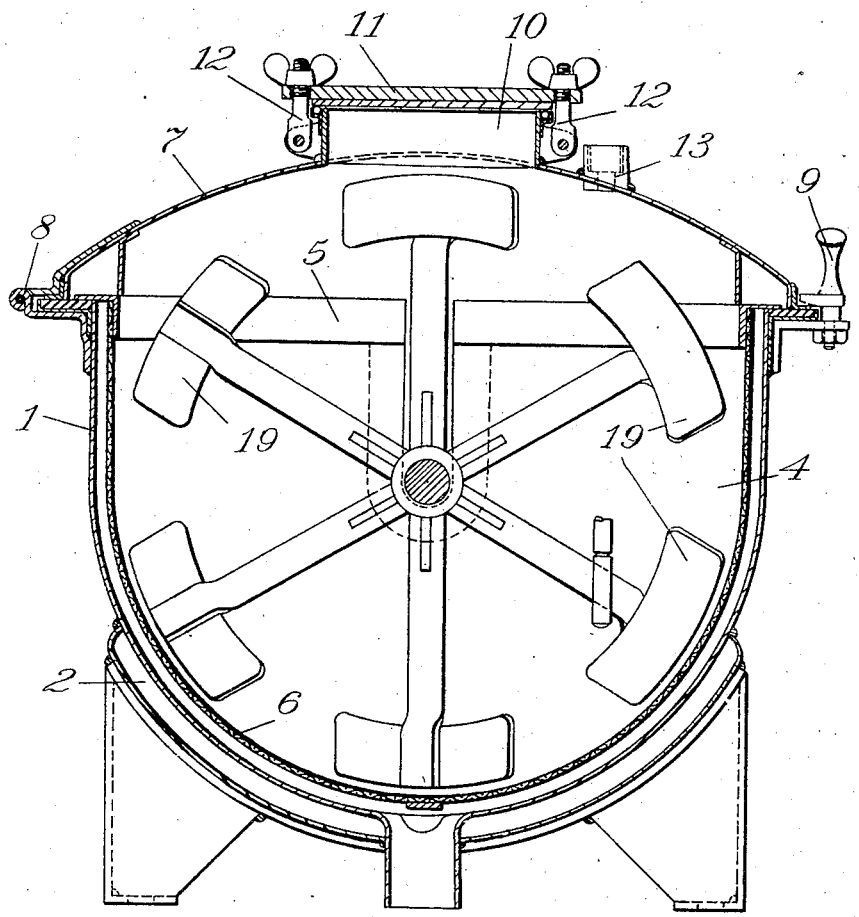

One construction of apparatus in accordance with the invention is illustrated by way of example in the accompanying drawings:

Figure 1 being a sectional elevation, and
Figure 2 a view in cross-secton thereof.

As shown in the drawings the apparatus comprises a vessel 1 furnished with a jacket 2 to which steam may be introduced by way of the pipe 3 for heating the contents of the vessel to the desired temperature.

In the vessel is located a foraminous basket 4 having a relatively rigid frame 5 clothed with wire gauze 6.

The vessel is provided with a lid 7 connected with it by a hinge 8 and furnishet with clamping means 9 and this lid is provided with an opening 10 furnished with a detachable cover 11 adapted to be secured in position by clamping means 12.

In the cover there is shown a tube 13 in which a thermometer may be inserted.

The end walls of the vessel 1 are furnished with bearings 14 in one of which is permanently journalled a shaft 15 provided with a pulley 16.

This shaft is formed with a socket 17 adapted to engage the end of a shaft 18 to which are secured paddle blades 19. The end of the shaft remote from the bearing is halved as indicated by 20 and is adapted to be engaged by means of a sleeve 21 with a similarly halved end of a shaft 22 to which also blades are secured, a ball catch 23 being provided for securing the sleeve from endwise movement, which is provided for in order to enable the two portions of the shaft to be separated and removed after which the basket may be removed for cleaning, emptying or inspection.

We claim:

1. The process of extracting gelatin or glue from collagen or ossein-containing materials having a fat or wax content which comprises treating the material with a dilute solution of caustic alkali of the order of 1 to 5 parts per thousand of water at a stabilizing temperature not substantially above 6° C. while maintaining the material in motion in a finely divided state in the alkali solution to effect saponification and emulsification of the fats and waxes, bleaching the resulting defatted and de-waxed material, and extracting the glue or gelatin therefrom.

2. The process as in claim 1 wherein the defatted, dewaxed, and bleached material is extracted with distilled water at a temperature of about 60° C. to 90° C. for the removal of the glue and gelatin content.

3. Process as defined in claim 1 wherein the bleaching is effected in two steps, first with sodium percarbonate as bleaching agent and subsequently with hydrogen peroxide, said bleaching being effected at a temperature not substantially exceeding 6° C.

JOSEPH KENYON.
VICTOR SILBERSTEIN.

REFERENCES CITED

The following references are of record in the file of this patent:

UNITED STATES PATENTS

| Number | Name | Date |
|---|---|---|
| 351,607 | LePage | Oct. 26, 1886 |
| 834,806 | Hilbert | Oct. 30, 1906 |
| 1,761,362 | Pansky | June 3, 1930 |
| 1,911,205 | Richardson | May 30, 1933 |